United States Patent [19]
Nicol

[11] 4,189,016
[45] Feb. 19, 1980

[54] EXACT CUP MEASURING TEA KETTLE WITH SPIRAL SPRING

[76] Inventor: Jack C. Nicol, 900 Scott Ave., North Cape May, N.J. 08204

[21] Appl. No.: 894,356

[22] Filed: Apr. 5, 1978

Related U.S. Application Data

[63] Continuation-in-part of Ser. No. 767,944, Feb. 11, 1977, abandoned.

[51] Int. Cl.² ............................................. G01G 19/56
[52] U.S. Cl. ..................................... 177/149; 177/225
[58] Field of Search ............... 177/149, 173, 174, 232, 177/231, 245, 225

[56] References Cited

U.S. PATENT DOCUMENTS

| | | | |
|---|---|---|---|
| 570,434 | 10/1896 | Johnson | 177/149 |
| 733,411 | 7/1903 | Maxwell | 177/231 X |
| 791,554 | 6/1905 | Hathaway | 177/232 X |
| 3,091,302 | 5/1963 | Wolven | 177/149 |

FOREIGN PATENT DOCUMENTS 86284  9/1957  Netherlands .............................. 177/149

*Primary Examiner*—Joseph W. Hartary
*Attorney, Agent, or Firm*—Clarence A. O'Brien; Harvey B. Jacobson

[57] ABSTRACT

A contents measuring tea kettle having a pivotally mounted handle which swings relative to a fluid-holding container portion of the kettle for actuating a load indicator assembly in order to permit measurement of the amount of fluid in the container as the container is being filled with the fluid. The load indicator assembly includes a spiral torsion spring connected to a dial member of the assembly and to a stationary portion of the kettle for placing a resistance between the pivotally mounted handle and the container of the kettle and causing a reading on the dial assembly which is a function of the amount of water within the kettle at a particular point in time. Further, the contents may be poured from the container, when the latter is only partially filled, in a controlled manner as though the handle were not pivotally mounted.

5 Claims, 8 Drawing Figures

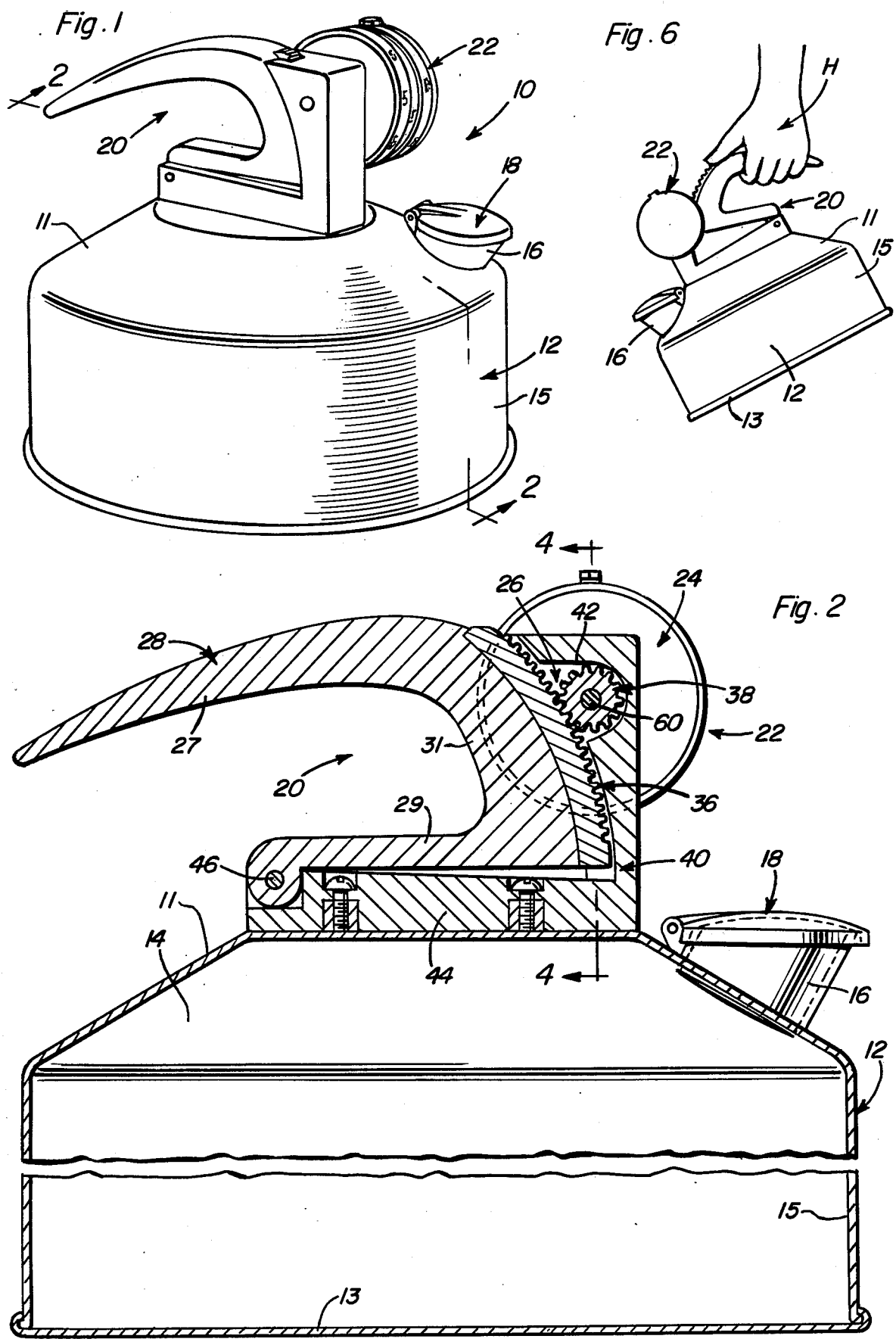

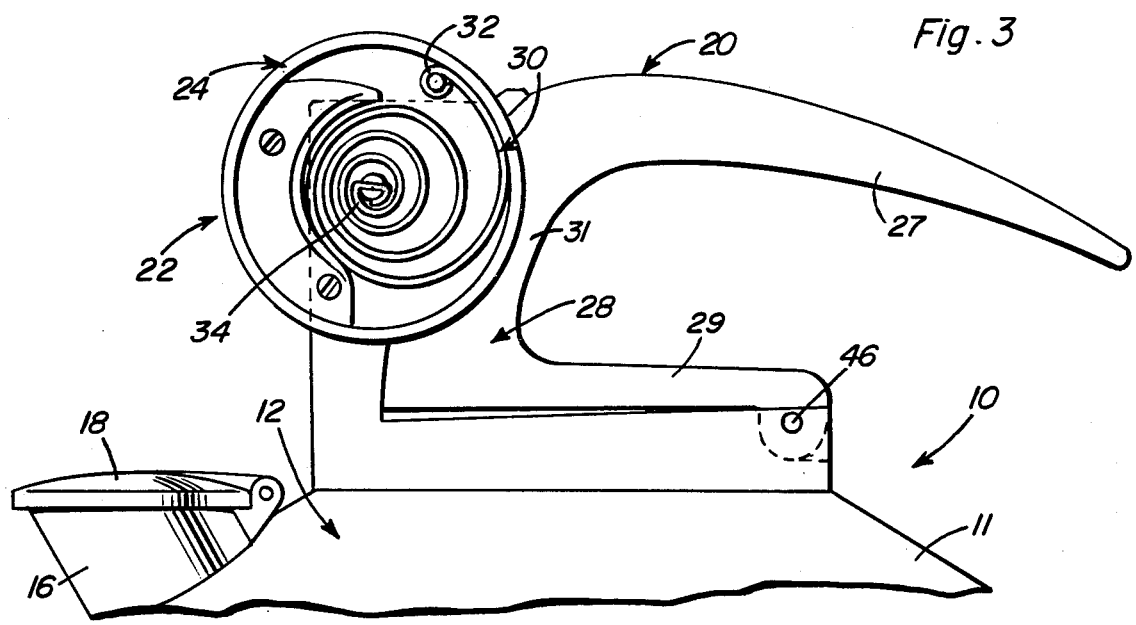
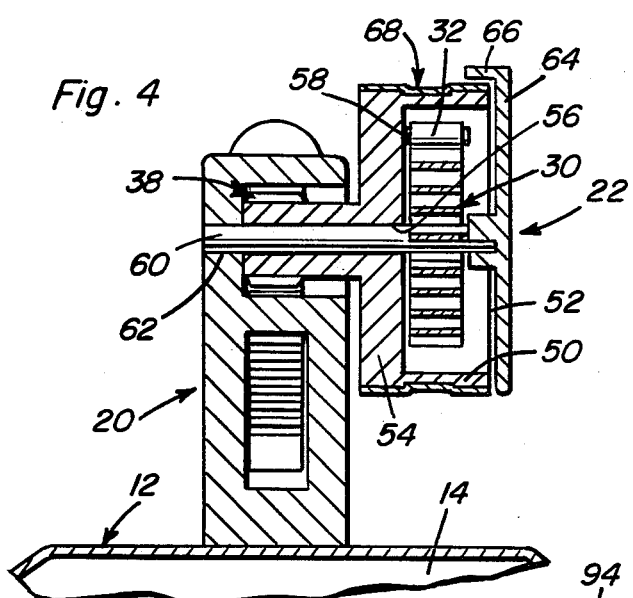
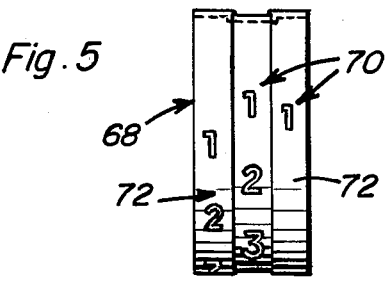
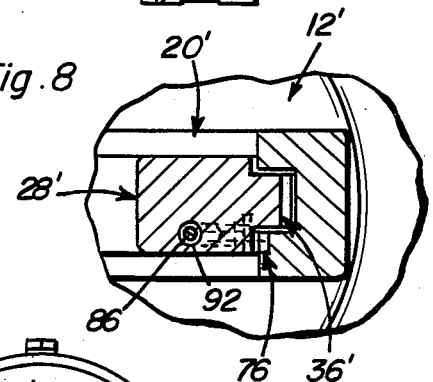
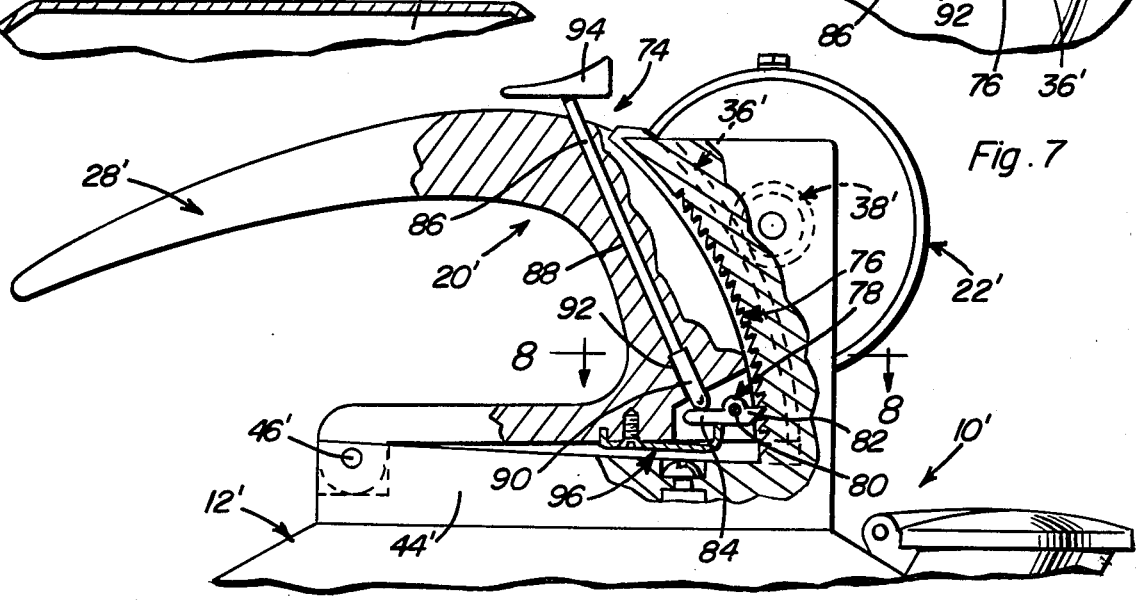

EXACT CUP MEASURING TEA KETTLE WITH SPIRAL SPRING

CROSS-REFERENCE TO RELATED APPLICATION

This application is a continuation-in-part of my copending U.S. application Ser. No. 767,944, filed Feb. 11, 1977 now abandoned.

BACKGROUND OF THE INVENTION

1. Field of the Invention

This invention relates generally to exact cup measuring tea kettles, and particularly to such a tea kettle which is capable of measuring the amount of water or other fluid within the kettle as the kettle is being filled with the fluid.

2. Description of the Prior Art

It is known generally to provide tea kettles, and the like, with devices for measuring the amount of liquid within the kettle. Several examples of which known devices were cited in my application Ser. No. 767,944, filed Feb. 11, 1977. In addition, Dutch Pat. No. 86,284, issued Sept. 16, 1957, to A. W. Wolven, discloses a fluid kettle having a spring attached to a pivoted handle and affixed to the stationary portion of the kettle for providing a determination of the amount of liquid within the kettle. A suitable lock is provided for securing the handle against swinging movement as desired when manipulating the kettle for pouring liquid from same, and the like. A basic disadvantage against using a simple coiled spring in the manner shown in this Dutch patent is that the kettle can only register the mass contained therein after the charge is received and the kettle is placed in a control position to level and calm the sloshing liquid. Reversed tangential forces caused by sloshing water, plus recoiling stress on the spring, will increase in intensity, setting up a varying plus and minus reading on the device. Thus, the arrangement as shown in the Dutch patent is not suitable for use in reading the amount of water in the kettle as the kettle is being filled in order to avoid placing an excess amount of water than that amount needed into the kettle.

U.S. Pat. Nos. 733,411, issued July 14, 1903, to W. Maxwell, and 791,554, issued June 6, 1905, to H. Hathaway, disclose weighing devices which employ a coil spring as a resistance against which the weight of an object is measured. It is apparent, however, that these known weighing devices cannot be readily installed onto a tea kettle for measuring the quantity of fluid in same, inasmuch as the resultant structure would have the same disadvantages as the kettle disclosed in the Dutch patent discussed above.

SUMMARY OF THE INVENTION

It is an object of the present invention to provide a tea kettle which permits continuous monitoring of the amount of fluid within the kettle, even when the kettle is being filled with the fluid.

It is another object of the present invention to provide a tea kettle of simple, yet rugged and reliable construction, yet permits accurate reading of the amount of fluid in the kettle, even when the kettle is being filled.

These an other objects are achieved according to the present invention by providing a contents measuring tea kettle having: a container forming a hollow cavity arranged for holding a quantity of fluid, an opening provided on the container and communicating with the cavity for permitting ingress and egress of a fluid with respect to the cavity, and a handle arrangement mounted on the container for facilitating manipulation of the container, with the improvement of the handle arrangement including a load indicator assembly for measuring the amount of fluid in the container as fluid is being passed through the opening and into the cavity of the container. The handle arrangement preferably includes a handle pivotally mounted on the container for pivotal movement with respect thereto, with the load indicator assembly comprising a dial device mounted on the container for providing a measure of an amount of fluid in the container, and a drive train connected to the dial device and to the handle for moving the dial device as a function of swinging movement of the handle. A resilient element is connected to the dial device and to the drive train for limiting swinging movement of the handle as a function of an amount of fluid in the container.

The resilient element preferably is a coil torsion spring having an outer end and an inner end, with the outer end being anchored to the dial device and the inner end being anchored to the drive train.

The drive train advantageously includes a rack formed on the handle of the handle assembly, and a pinion disposed in engagement with the rack and attached to the dial device for rotating the dial device as a function of swinging movement of the handle.

The dial device preferably includes a hollow dial member of cylindrical configuration and having a cylindrical wall defining a chamber, an open end providing access to the chamber, and an enclosed end. A pin extends into the cavity from the enclosed end of the dial member, with an aperture being provided in the enclosed end centrally thereof. The pinion of the drive train is formed on the enclosed end of the dial member and extends away from the chamber thereof, with a shaft being affixed to the handle arrangement and being disposed in the aperture provided in the enclosed end of the dial member. A pointer element is affixed to the shaft and arranged covering the open end of the hollow member for having a projection provided thereon orivude a stationary point of reference for determining relative positions of the dial member.

A paticularly advantageous feature of the present invention is the provision of a lock arrangement on the handle arrangement for selectively retaining the handle in fixed position relative to the container. Preferably, this lock arrangement comprises a further rack provided on a stationary portion of the handle arrangement, and having engageable therewith one of the arms of a latch pivotally mounted on the stationary portion of the handle arrangement so as to have a pair of opposed arms. A plunger slidably mounted on the handle engages with the other of the arms of the latch for retaining the one of the arms of the latch in engagement with the further rack when the plunger is permitted to move outwardly of the handle under the bias of a leaf spring disposed beneath the other of the arms of the latch.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view showing an exact cup measuring tea kettle according to the present invention.

FIG. 2 is an enlarged, fragmentary, sectional view taken generally along the line 2—2 of FIG. 1.

FIG. 3 is a fragmentary, side elevational view looking from the rear in FIG. 2, but with some parts removed to show the interior of the load indicator assembly according to the present invention.

FIG. 4 is a fragmentary, sectional view taken generally along the line 4—4 of FIG. 2.

FIG. 5 is an elevational view showing the removable sleeve provided with indicia reflecting various units of measure for use with a load indicator assembly according to the present invention.

FIG. 6 is a schematic, side elevational view, showing the manner in which a tea kettle as illustrated in FIGS. 1 through 5 is used to indicate a measure of the amount of fluid within the kettle.

FIG. 7 is a fragmentary, side elevational view, partly cut away and in section, and similar to the upper portion of FIG. 2, but showing a modified embodiment of the present invention wherein a lock arrangement is provided for deactivating the load indicator assembly of the invention.

FIG. 8 is a fragmentary, sectional view taken generally along the line 8—8 of FIG. 7.

DESCRIPTION OF THE PREFFERRED EMBODIMENTS

Referring now more particularly to FIGS. 1 through 6 of the drawings, a contents measuring tea kettle 10 according to the present invention comprises a container 12 constructed in the conventional manner having a closed top 11 and bottom 13 connected by an outer peripheral wall 15 extending about and between the top 11 and bottom 13 for forming a hollow cavity 14 arranged for holding a quantity of fluid (not shown) such as water and the like, and with an opening in the form of a spout 16 provided on container 12 and communicating with cavity 14 for permitting ingress and egress of a fluid with respect to the cavity. A cover 18 is pivotally mounted on container 12 so as to selectively block the opening formed by spout 16. A handle arrangement 20 is mounted centrally on the top of the container 12 for facilitating manipulation of container 12, with a load indicator assembly 22 being included in handle arrangement 20 for measuring the amount of fluid in container 12 as the fluid is being poured through spout 16 and into cavity 14 of container 12.

Load indicator assembly 22 includes a dial device 24 mounted on container 12 for providing a measure of an amount of fluid in the cavity 14 of container 12. A drive train 26 is connected to dial device 24 and a pivotally mounted handle 28 of handle arrangement 20 for moving dial device 24 as a function of swinging movement of handle 28. A resilient element in the form of spring 30 is connected to dial device 24 and drive train 26 for limiting swinging movement of handle 28 as a function of an amount of fluid in the container 12. This spring 30 is in the form of a spiral torsion spring having an outer end 32 and an inner end 34, with end 32 being anchored to the dial device 24, and the inner end 34 being anchored to container 12.

Drive train 26 includes a rack 36 formed on the forwardmost portion of the outer surface of handle 28 of handle arrangement 20, with a pinion 38 being rotatably mounted on handle arrangement 20 so as to be in engagement with rack 36 and attached to the dial device 24 for rotating same as a function of the swinging movement of handle 28. More specifically, handle arrangement 20 includes an upright stationary portion 40 provided with a recess 42 in which the pinion 38 is disposed, and with a base portion 44 extending along the upper surface of container 12. A pin 46 pivotally mounts handle 28 on base portion 44 in a conventional manner so as to permit handle 28 to swing relative to stationary portion 40, base portion 44, and container 12. The handle 28 is generally C-shaped and includes a pair of generally parallel upper and lower arms 27 and 29 interconnected at one pair of corresponding ends by means of an integral bight portion 31, the longitudinal mid-portion of arm 27 being vertically spaced above pin 46.

Dial device 24 includes a hollow dial member 48 of cylindrical configuration and having a cylindrical wall 50 forming a chamber and extending between an open end 52 providing access to the chamber, and an enclosed end 54 provided with an aperture 56 centrally thereof. A peg 58 extends into the chamber formed by cylindrical wall 50 so as to form in a known manner an anchor for the outer end 32 of spring 30, while the inner end 34 of spring 30 is attached in a conventional manner, such as by the use of an appropriate slot, to a shaft 60 affixed to stationary portion 40 of handle arrangement 20 as by a suitable socket 62 into which shaft 60 is fit. A pointer element 64 is affixed to shaft 60 and arranged covering open end 52 of dial member 48 for permitting a projection 66 of pointer element 64, which projection 66 extends perpendicularly to the plane of element 64, to provide a stationary pointer reference for determining the relationship of the position of dial member 48 relative to the stationary portion 40 of handle arrangement 20.

A sleeve 68 provided with indicia 70 indicating various units of measure of fluid quantity, such as cups, St. Dennis cups, metric measure, and the like, is disposed on cylindrical wall 50 so as to permit minor recalibration. As spring 30 wears and fatigues, a user can manually block the wheel and rotate the snug fitting sleeve 68 to a proper setting after putting a pre-measured amount of fluid into the kettle. Thus, dial device 24 is recalibrated. Sleeve 68 is provided with rims 72 which cooperate with similar rims on the outer surface of wall 50 to provide a snap-fit of sleeve 68 onto the wall 50.

Referring now more particularly to FIGS. 7 and 8 of the drawings, an exact cup measuring tea kettle 10' is illustrated which is similar to tea kettle 10, but includes a lock arrangement 74 for restraining the handle 28' of the kettle 10' for swinging movement when it is desired to pour fluid from kettle 10' and the like. Those parts of kettle 10' which are equivalent to the similar parts of kettle 10 are designated with the same reference numeral as the comparable part of kettle 10, but accompanied by a prime.

Lock arrangement 74 comprises a further rack 76 provided on stationary portion 40' of handle arrangement 20'. A latch 78 is pivotally mounted on the stationary portion 40' as by a pin 80, and has a pair of opposed arms 82 and 84, arm 82 of which is selectively engageable with rack 76 for permitting swinging movement of handle 28' away from the associated stationary portion 40' and base portion 44'. A plunger 86 is slidably mounted in a bore 88 provided on handle 28' at the forward portion thereof, and is engageable at a tip 90 of plunger 86 with the arm 84 of latch 78 for retaining the arm 82 of latch 7y8 out of engagement with the teeth of rack 76. Tip 90 is itself disposed in a counterbore 92 forming one terminal end of bore 88. A suitable button 94 is provided at the other of the ends of plunger 86, that being the end spaced from tip 90, for permitting tip 90 to be pivoted the pawl formed by latch 78 out of engagement with the teeth of rack 76, while a suitable leaf spring 96 is mounted on the lower surface of handle 28', immediately opposite the upper surface of base portion 44', for normally forcing latch 78 into engagement with the teeth of rack 76. By this arrangement, handle 28' will be free to move relative to stationary portion 40 when button 94 is depressed toward handle 28' in order to cause engagement of tip 90 of plunger 86 with arm 84 of the pawl or latch 78 and force arm 82 of latch 78 into engagement with the teeth of rack 76. Thus, it will be appreciated that rack 76 and latch 78 function in a manner of a pawl and ratchet mechanism.

Further, when the user sets the kettle on a range (not shown) for heating the contents of the kettle, the force of the spiral spring automatically drops the handle to the original position and the leaf spring 96 automatically locks the handles in place again.

In both illustrated embodiments, the rack terminates before the bottom of the handle so as to form a stop which prevents the handle and rack from separating and dropping the container substantially 180 degrees from the handle and possibly scalding a user.

As can be readily understood from the above description and from the drawings, an exact cup measuring tea kettle according to the present invention permits the amount of fluid, such as water, being put into the kettle to be determined in a simple and efficient manner resulting in a substantial savings not only in the amount of fluid used but also in the amount of fuel required to heat the fluid within the kettle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination, a hollow container including a closed top and bottom, a peripheral wall extending between said top and bottom and a pour spout opening outwardly of the interior of said container adjacent one side thereof and at an elevation generally horizontally registered with said closed top, a handle including a first lower portion pivotally supported from said container for oscillation relative thereto about a generally horizontal axis spaced inwardly of and adjacent the side of said container remote from said one side and disposed at generally right angles relative to a path extending between said one side and said remote side, said handle including an upper elongated horizontal portion generally paralleling said path and a depending portion supported from and depending downward from the end of said horizontal portion adjacent said one side, said depending portion and closed top including opposing abutment surfaces establishing a downward limit position of movement of said depending portion relative to said top, spring means operatively connected between said depending portion and said closed top yieldingly biasing said depending portion toward said limit position, indicator means connected between said handle and container operative to indicate the amount of upward movement of said depending portion from said limit position, said axis being horizontally spaced above the level of said spout, said upper horizontal portion of said handle including a hand engageable mid-portion centrally disposed above said closed top.

2. The combination of claim 1 wherein said indicator means includes dial means mounted on the container for providing a measure of an amount of fluid in the container, drive means connected between the dial means and to the handle for moving the dial means as a function of swinging movement of the handle, said spring means being connected to the dial means and to the drive means for limiting swinging movement of the handle as a function of an amount of fluid in the container.

3. The combination of claim 2 wherein the spring means includes a spiral portion spring having an outer end and an inner end, the outer end being anchored to the dial means and the inner end being anchored to the container.

4. The combination of claim 3 wherein the drive means includes a rack formed on said depending portion, and a pinion arranged in engagement with the rack and attached to the dial means for rotating the dial means as a function of swinging movement of the handle.

5. The combination of claim 1 wherein the handle and container include coacting structure releasably operatively engaged with each other for selectively retaining the handle in fixed position relative to the container.

* * * * *

UNITED STATES PATENT AND TRADEMARK OFFICE
CERTIFICATE OF CORRECTION

PATENT NO. : 4,189,016
DATED : February 19, 1980
INVENTOR(S) : Jack C. Nicol

It is certified that error appears in the above—identified patent and that said Letters Patent is hereby corrected as shown below:

On the Title Page, Item (76) "900 Scott Ave., North Cape May, N. J. 08204" should read -- 225 Cloverdale, Villas, N. J. 08251 --.

*Signed and Sealed this*

*Twenty-seventh* Day of *May 1980*

[SEAL]

*Attest:*

SIDNEY A. DIAMOND

*Attesting Officer*

*Commissioner of Patents and Trademarks*